United States Patent
Clemmensen et al.

(10) Patent No.: US 11,636,170 B1
(45) Date of Patent: *Apr. 25, 2023

(54) NORMALIZING UNIFORM RESOURCE LOCATORS

(71) Applicant: Siteimprove A/S, Copenhagen (DK)

(72) Inventors: Asbjørn Clemmensen, Copenhagen (DK); Morten Fjord-Larsen, Frederiksberg (DK); Morten Eskesen, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,441

(22) Filed: Jun. 9, 2022

Related U.S. Application Data

(63) Continuation of application No. 17/590,586, filed on Feb. 1, 2022, now Pat. No. 11,397,789.

(60) Provisional application No. 63/277,957, filed on Nov. 10, 2021.

(51) Int. Cl.
*G06F 16/955* (2019.01)
*H04L 67/306* (2022.01)

(52) U.S. Cl.
CPC ........ *G06F 16/9566* (2019.01); *H04L 67/306* (2013.01)

(58) Field of Classification Search
CPC .......... G06F 16/9574; G06F 1/00; G06F 5/00; G06F 16/951; G06F 16/9566; H04L 67/306

See application file for complete search history.

(56) References Cited

U.S. PATENT DOCUMENTS

| 836,414 | A | 11/1906 | Toles |
| 6,360,235 | B1 | 3/2002 | Tilt |
| 7,231,606 | B2 | 6/2007 | Miller et al. |
| 7,475,067 | B2 * | 1/2009 | Clary .................... G06F 16/958 |
| | | | 707/999.005 |
| 7,558,795 | B2 | 7/2009 | Malik et al. |
| 7,584,435 | B2 | 9/2009 | Bailey et al. |

(Continued)

FOREIGN PATENT DOCUMENTS

WO    WO 2012/027022    3/2012

OTHER PUBLICATIONS

EP Supplementary Search Report in European Application No. EP18853482, dated Mar. 29, 2020, 9 pages.

(Continued)

*Primary Examiner* — Mahran Y Abu Roumi
(74) *Attorney, Agent, or Firm* — Barnes & Thornburg LLP

(57) ABSTRACT

The subject matter described in this disclosure can be embodied in methods and systems for receiving, by a computing system, a request to normalize an input Uniform Resource Locator (URL). The computing system identifies a user account to which the request to normalize the input URL relates. The computing system determines a selected set of URL normalization rules that are identified as being activated for the user account from among a larger collection of URL normalization rules. The computing system normalizes the input URL using the selected set of URL normalization rules to generate a normalized URL. The computing system stores information that results from an analysis of the input URL in association with an indication of the normalized URL.

16 Claims, 9 Drawing Sheets

(56) References Cited

U.S. PATENT DOCUMENTS

| | | | |
|---|---|---|---|
| 7,747,749 B1* | 6/2010 | Erikson | G06F 16/9574 |
| | | | 709/219 |
| 7,797,200 B2 | 9/2010 | Patrawala | |
| 7,805,428 B2 | 9/2010 | Batista Reyes et al. | |
| 8,065,410 B1* | 11/2011 | Breen | G06F 11/3414 |
| | | | 702/182 |
| 8,196,104 B2 | 6/2012 | Cohrs et al. | |
| 8,447,751 B2 | 5/2013 | Stouffer et al. | |
| 8,533,684 B2 | 9/2013 | Brunet et al. | |
| 8,554,698 B2 | 10/2013 | Bando et al. | |
| 8,613,039 B2* | 12/2013 | Chen | H04L 67/10 |
| | | | 726/1 |
| 8,972,379 B1 | 3/2015 | Grieselhuber et al. | |
| 9,009,784 B2 | 4/2015 | Chen et al. | |
| 9,087,035 B1 | 7/2015 | Bandaru et al. | |
| 9,152,729 B2 | 10/2015 | Ajoku et al. | |
| 9,537,732 B2 | 1/2017 | Mukheijee et al. | |
| 9,563,422 B2 | 2/2017 | Cragun et al. | |
| 10,114,902 B2 | 10/2018 | Byakod et al. | |
| 10,169,188 B2* | 1/2019 | Belekar | G06F 9/451 |
| 10,534,512 B2 | 1/2020 | Jadhav et al. | |
| 10,706,122 B2* | 7/2020 | Sabbavarpu | H04Q 1/20 |
| 10,831,831 B2 | 11/2020 | Greene | |
| 10,860,594 B2 | 12/2020 | Jamshidi | |
| 10,963,470 B2 | 3/2021 | Jamshidi | |
| 10,970,294 B2 | 4/2021 | Jamshidi | |
| 11,113,276 B2 | 9/2021 | Zhao | |
| 11,262,979 B2 | 3/2022 | Deshmukh et al. | |
| 2004/0039734 A1* | 2/2004 | Judd | G06F 16/24578 |
| 2006/0253345 A1 | 11/2006 | Herber | |
| 2008/0133500 A1 | 6/2008 | Edwards | |
| 2009/0113287 A1 | 4/2009 | Yee | |
| 2010/0042608 A1 | 2/2010 | Kane | |
| 2012/0010927 A1 | 1/2012 | Attenberg et al. | |
| 2012/0017281 A1 | 1/2012 | Bannerjee et al. | |
| 2012/0047120 A1 | 2/2012 | Connolly | |
| 2012/0254405 A1 | 10/2012 | Ganesh et al. | |
| 2012/0254723 A1 | 10/2012 | Kasa et al. | |
| 2013/0282691 A1 | 10/2013 | Stouffer et al. | |
| 2014/0164345 A1 | 6/2014 | Connolly et al. | |
| 2014/0304578 A1 | 10/2014 | Parkinson et al. | |
| 2015/0039746 A1 | 2/2015 | Mukheijee et al. | |
| 2015/0317132 A1 | 11/2015 | Rempell et al. | |
| 2015/0348071 A1 | 12/2015 | Cochrane et al. | |
| 2016/0055490 A1* | 2/2016 | Keren | G06Q 30/00 |
| | | | 705/14.47 |
| 2016/0210360 A9 | 7/2016 | Stouffer et al. | |
| 2016/0353148 A1 | 12/2016 | Prins et al. | |
| 2018/0210965 A1 | 7/2018 | Grigoryan et al. | |
| 2019/0073365 A1 | 3/2019 | Jamshidi | |
| 2020/0151187 A1 | 5/2020 | Jamshidi | |
| 2020/0394200 A1 | 12/2020 | Jamshidi | |
| 2021/0326348 A1 | 10/2021 | Jamshidi | |

OTHER PUBLICATIONS

Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
International Preliminary Report on Patentability in PCT Appln. No. PCT/US2018/049809, dated Mar. 10, 2020, 13 pages.
International Search Report and Written Opinion in Application No. PCT/US2018/049809, dated Nov. 19, 2018, 13 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.
Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866/#h_01F0GCPTWX5H3ZS558V1GVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.
Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.
Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.
Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.
Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.
Siteimprove.com [online], "Siteimprove CMS Plugin Integration Cookbook," available on or before Aug. 5, 2020, via Internet Archive: Wayback Machine URL <https://web.archive.org/web/20200805195514/https://developer.siteimprove.com/cms-plugin-integration-cookbook/>, retrieved on Mar. 21, 2022, URL<https://developer.siteimprove.com/cms-plugin-integration-cookbook/>, 13 pages.
Siteimprove.com [online], "Web accessibility for all with the next generation of Siteimprove Accessibility," Mar. 20, 2020, retrieved

(56) References Cited

OTHER PUBLICATIONS on Mar. 21, 2022, retrieved from URL<https://siteimprove.com/en-us/blog/web-accessibility-for-all-with-next-generation-siteimprove-accessibility/>, 36 pages.
Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.
Zhou, "Evaluating Websites Using a Practical Quality Model", Software Technology Research Laboratory, De Montfort University, 2009, 113 pages.
International Search Report and Written Opinion in International Appln. No. PCT/IB2022/050925, dated Jul. 27, 2022, 15 pages.
Lee et al., "On URL Normalization," Electronic Publishing, Artistic Imaging, and Digital Typography (Lecture Notes in Computer Science), May 9, 2005, vol. 3481, pp. 1076-1085.

\* cited by examiner

Different Variations of a URL normalize to the same URL

Different URLs normalize to different URLs

The same URL can normalize to different normalized URLs

NORMALIZING UNIFORM RESOURCE LOCATORS

REFERENCE TO CO-PENDING APPLICATION

This application claims the benefit of priority to U.S. patent application Ser. No. 17/590,586, filed on Feb. 1, 2022 and entitled "NORMALIZING UNIFORM RESOURCE LOCATORS", which claims benefit under 35 U.S.C. § 119(e) to U.S. Provisional Patent Application No. 63/277,957, filed Nov. 10, 2021 and entitled "NORMALIZING UNIFORM RESOURCE LOCATORS", the entire disclosures set forth therein being is incorporated herein by reference.

TECHNICAL FIELD

This document generally relates to technologies that normalize uniform resource locators.

BACKGROUND

Web pages are typically accessible via the internet using corresponding uniform resource locators (URLs). URLs can be formed of different portions. For example, the URL "https://www.example.com:443/category?queryterm=parameter#fragment" includes a scheme (https://), a subdomain (www), a domain (example.com), a port number (:443), a path (/category), a query string separator (?), a query string (queryterm=parameter), and a fragment (#fragment). Different variations of a URL can reference the same web page.

SUMMARY

This document describes techniques, methods, systems, and other mechanisms for normalizing URLs.

Particular implementations of the technology described in this document can, in certain instances, realize one or more of the following advantages. A computing system that includes multiple services that store information in association with indications of normalized URLs can access a single system that uniformly normalizes URLs. As such, the computing system can use a single webpage identifier to access information concerning the same webpage across multiple datasets.

Another advantage is that the URL normalization rules used to normalize a given URL can be user account specific, such that different user accounts may specify different combinations of URL normalization rules to be used in forming normalized URLs for these different user accounts.

A user account may specify that a certain set of URL normalization rules should be used for a first group of webpages and that a different set of URL normalization rules should be used for a second group of webpages. As such, normalization rules can be not only user account specific, but also tailored to specific websites or portions of a website, which enables customization of URL normalization rules to particular webpages.

Normalized URLs can also be hashed to generate a shorter numerical identifier that represents the normalized URL, which can eliminate a future need to access a database in order to find an identifier for a normalized URL.

As additional description to the embodiments described below, the present disclosure describes the following embodiments.

Embodiment 1 is a computer-implemented method, comprising: receiving, by a computing system, a request to normalize an input Uniform Resource Locator (URL); identifying, by the computing system, a user account to which the request to normalize the input URL relates; determining, by the computing system, a selected set of URL normalization rules that are identified as being activated for the user account from among a larger collection of URL normalization rules; normalizing, by the computing system, the input URL using the selected set of URL normalization rules to generate a normalized URL; and storing, by the computing system, information that results from an analysis of the input URL in association with an indication of the normalized URL.

Embodiment 2 is the computer-implemented method of embodiment 1, comprising: receiving, by the computing system, a second request to normalize a second input URL, the second input URL being different from the input URL; identifying, by the computing system, that the second request to normalize the second input URL relates to same said user account to which the request to normalize the input URL relates; normalizing, by the computing system, the second input URL using the selected set of URL normalization rules to generate same said normalized URL, based on the selected set of URL normalization rules being activated for the user account; and storing, by the computing system, second information that results from an analysis of the second input URL in association with the indication of the normalized URL.

Embodiment 3 is the computer-implemented method of embodiment 2, comprising: receiving, by the computing system, a request for information stored in association with the indication of the normalized URL; and accessing, by the computing system, the information and the second information using the indication of the normalized URL to access the information and the second information, without the accessing using the input URL and without the accessing using the second input URL.

Embodiment 4 is the computer-implemented method of any one of embodiments 1-3, comprising: providing, by the computing system for receipt by a computing device at which the user account has logged in, information to cause the computing device to present a user interface to activate normalization rules, the user interface presenting content that indicates multiple URL normalization rules from the collection of URL normalization rules along with corresponding activation interface elements that enable user input to selectively activate selected URL normalization rules of the multiple URL normalization rules that are indicated by the user interface, and receiving, by the computing system, an indication that user input at the computing device interacted with activation interface elements presented by the user interface to activate the selected set of URL normalization rules for the user account.

Embodiment 5 is the computer-implemented method of embodiment 4, wherein: the multiple URL normalization rules represent the collection of URL normalization rules, such that the user interface presents content that indicates all URL normalization rules of the collection of URL normalization rules.

Embodiment 6 is the computer-implemented method of embodiment 4, wherein: the user interface presents content that indicates each default normalization rule in a group of default normalization rules, each default normalization rule in the group of default normalization rules being unaccompanied by a corresponding activation interface element, such that each default normalization rule in the group of default normalization rules is applied during URL normalization despite which normalization URLS of the collection of URL normalization rules are activated in association with the user account.

Embodiment 7 is the computer-implemented method of any one of embodiments 4-6, wherein the user input at the computing device that interacted with the activation interface elements to activate the selected set of URL normalization rules includes: a first user input that interacted with a first activation interface element to activate a first URL normalization rule from the collection of URL normalization rules; and a second user input that interacted with a second activation interface element to activate a second URL normalization rule from the collection of URL normalization rules.

Embodiment 8 is the computer-implemented method of embodiment 7, wherein: the first user input that activated the first URL normalization rule included a first user interaction with the first activation element without entry of user-specified text, the first URL normalization rule not being customizable by user input through interaction with the user interface.

Embodiment 9 is the computer-implemented method of embodiment 8, wherein: the second user input that activated the second URL normalization rule included a second user interaction with the second activation element to enter user-specified text, the user-specified text indicating text content in URLs on which the second URL normalization rule is to operate.

Embodiment 10 is the computer-implemented method of embodiment 9, wherein: the second URL normalization rule is configured to modify the user-specified text in a manner that is defined by the second URL normalization rule and not defined by the user-specified text, the manner that the second URL normalization rule is configured to modify the user-specified text not being customizable by user input through interaction with the user interface.

Embodiment 11 is the computer-implemented method of embodiments 1-10, comprising: receiving, by the computing system, a second request to normalize a second input URL; identifying, by the computing system, a second user account to which the second request to normalize the second input URL relates; determining, by the computing system, a second selected set of URL normalization rules that are identified as being activated for the second user account from among the larger collection of URL normalization rules, the second selected set of URL rules that are activated for the second user account being different from the selected set of URL normalization rules that are activated for the user account; normalizing, by the computing system, the second input URL using the second selected set of URL normalization rules to generate a second normalized URL, the second normalized URL being different from the normalized URL; and storing, by the computing system, information that results from an analysis of the second input URL in association with an indication of the second normalized URL.

Embodiment 12 is the computer-implemented method of any one of embodiments 1-11, wherein: identifying the user account to which the request to normalize the input URL relates includes identifying that the request to normalize the input URL specifies the user account.

Embodiment 13 is the computer-implemented method of any one of embodiments 1-12, comprising: hashing, by the computing system, the normalized URL to identify a hashed value that represents the normalized URL, the indication of the normalized URL comprising the hashed value.

Embodiment 14 is the computer-implemented method of embodiment 13, comprising: receiving, by the computing system, a request for information that results from a URL analysis, the request for information that results from the URL analysis including the hashed value; and accessing, by the computing system using the hashed value and without using the input URL responsive to receiving the hashed value in the request for information that results from the URL analysis, the information that results from the analysis of the input URL.

Embodiment 15 is the computer-implemented method of embodiment 14, comprising: accessing, by the computing system using the hashed value and without using the input URL responsive to receiving the hashed value in the request for information that results from the URL analysis, information that results from an analysis of a second URL, wherein the normalized URL represents a normalized version of the second URL when the second URL is normalized according to the selected set of normalization rules.

Embodiment 16 is the computer-implemented method of any one of embodiments 1-15, comprising: providing, by the computing system for receipt by a computing device at which the user account has logged in, information to cause the computing device to present a user interface to activate normalization rules, the user interface presenting activation interface elements that enable user input to (i) select a selected group of URLs from among multiple different groups of URLs, and (ii) select a portion of the collection of URL normalization rules to apply to the selected group of URLs; and receiving, by the computing system, user input that interacts with the activation interface elements of the user interface to specify that the selected set of URL normalization rules are to apply to URLs in a first group of URLs from among the multiple different groups of URLs; and identifying, by the computing system, that the input URL is part of the first group of URLs, wherein determining the selected set of URL normalization rules that are identified as being activated for the user account includes identifying that the selected set of URL normalization rules were specified by user input as applying to the first group of URLs and that the input URL is part of the first group of URLs.

Embodiment 17 is the computer-implemented method of embodiment 16, comprising: receiving, by the computing system, user input that interacts with the activation interface elements presented as part of the user interface to specify that a second selected set of URL normalization rules are to apply to URLs in a second group of URLs from among the multiple different groups of URLs, wherein the second group of URLs is different from the first group of URLs, wherein the second selected set of URL normalization rules are different from the selected set of URL normalization rules.

Embodiment 18 is the computer-implemented method of embodiment 17, comprising: receiving, by a computing system, a request to normalize a second input URL; identifying, by the computing system, that the second input URL is part of the second group of URLs; normalizing, by the computing system, the second input URL using the second selected set of URL normalization rules to generate a second normalized URL, wherein the second selected set of normalization rules includes a normalization rule that is not within the selected set of normalization rules; hashing, by the computing system, the second normalized URL using a combination of all URL rules from the selected set of URL normalization rules and all URL rules from the second selected set of URL normalization rules, including the normalization rule that is not within the second selected set of normalization rules and excluding multiple normalization rules from the collection of URL normalization rules that are not activated for the user account, to identify a second hashed value that identifies the second normalized URL; and storing, by the computing system, information that results from an analysis of the second input URL in association with the second hashed value.

Embodiment 19 is a computing system, comprising: one or more processors; and one or more computer-readable devices including instructions that, when executed by the one or more processors, cause the computing system to perform operations that include: receiving, by the computing system, a request to normalize an input Uniform Resource Locator (URL); identifying, by the computing system, a user account to which the request to normalize the input URL relates; determining, by the computing system, a selected set of URL normalization rules that are identified as being activated for the user account from among a larger collection of URL normalization rules; normalizing, by the computing system, the input URL using the selected set of URL normalization rules to generate a normalized URL; and storing, by the computing system, information that results from an analysis of the input URL in association with an indication of the normalized URL.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes technologies for normalizing URLs. A URL normalizing system can be configured to normalize URLs using URL normalization rules. The set of URL normalization rules applied to a given URL may depend on a user account that requested the URL normalization, and which URL normalization rules are activated for that user account.

A user that logs into the URL normalizing system with a given user account may interact with a user interface that presents indications of multiple different URL normalization rules. Some rules may be activated by default and cannot be deactivated by user input, while the user interface may include interface elements that enable user activation of optional rules. User input may activate URL normalization rules for all URLs, or just for a specific to a group of URLs (e.g., a particular website or a portion thereof).

After normalizing a URL, the URL normalizing system may store information regarding a webpage in conjunction with some sort of indication of the normalized URL (e.g., the normalized URL or a number that represents the normalized URL). This indication of the normalized URL may be used as an identifier to retrieve the information regarding the webpage. In some examples, indication of the normalized URL is a hash value generated by hashing the normalized URL. In such examples, information regarding a webpage may be stored in conjunction with the hash value. As such, the hash value may be used as an identifier to retrieve information regarding the webpage.

Figure 1:
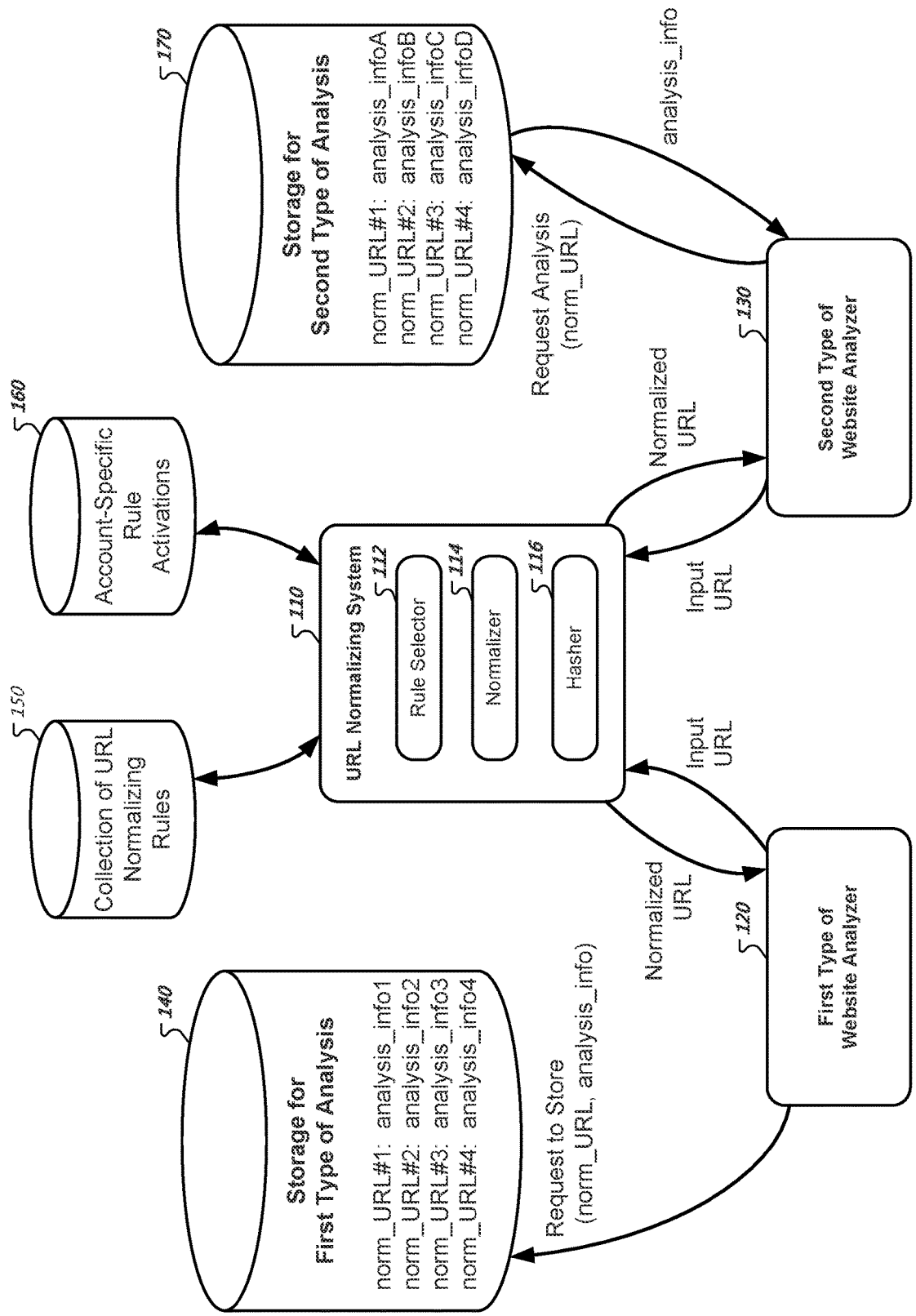
FIG. 1 shows a computing system that is configured to normalize URLs.

FIG. 1 shows a computing system that is configured to normalize URLs. The computing system includes a URL normalizing system 110, two different types of website analyzers 120 and 130, respective storage for two different types of analysis 140 and 170, storage for a collection of URL normalizing rules 150, and storage for account-specific rule activations 160.

The first type of website analyzer 120 and the second type of website analyzer 130 each represent one or more computer programs that analyze certain characteristics of a website. For example, both types of website analyzers 120 and 130 may be operated by a company that analyzes websites and provides results of such analysis to owners of the websites, to help the owners improve various characteristics of the websites. A first example type of website analysis includes determining how accessible the website is to users that have accessibility issues (e.g., users that have poor eyesight, hearing, or finger dexterity). A second example type of website analysis includes determining how well the website ranks on search engines, commonly called SEO (search engine optimization). A third example type of website analysis includes determining a quality of content of the website, such as whether words are spelled correctly and links are valid.

The first type of website analyzer 120 may be configured to perform one of these types of website analyses (e.g., an accessibility analysis), while the second type of website analyzer 130 may be configured to perform a second of these types of website analyses (e.g., an SEO analysis). Each of the website analyzers 120 and 130 may analyze websites themselves, request analyses from one or more third-party services, or perform a combination of both.

Each website analysis may identify multiple webpages, and multiple issues that occur across the webpages (e.g., misspellings, broken links, accessibility issues on various pages). An identity of each page may be originally specified by a URL. A difficulty is that many webpages can be represented by multiple different URL variations. For example, the first type of website analyzer 120 may receive an analysis from a third-party analysis service, and a URL of a webpage specified in the analysis may include query parameters that the third-party analysis appended to the URL to track requests to the URL. The first type of website analyzer 120 may perform its own analysis of the same webpage, but the URL recorded for such an analysis may not include the same query parameters. As such, two different analyses for the same webpage may be stored in association with different URLs. Similarly, a second type of analysis of the same webpage by the second type of website analyzer 130 may be associated with yet a different URL.

The URL normalizing system 110 is configured to receive input URLs from the website analyzers 120 and 130, and return normalized URLs. The website analyzers 120 and 130 may then store analyses of webpages in association with (1) the normalized URLs, or (2) indications of the normalized URLs (e.g., numerical identifiers assigned to the normalized URLs). As such, multiple analyses of the same webpage that were initially associated across a computing system with different URLs may be stored in association with a single indication of a normalized URL for the webpage.

The URL normalizing system 110 can receive an input URL in a URL normalization request. The request can specify a user account to which the request relates. For example, an accessibility analysis of a particular website may have been requested by an owner of the particular website. In preparing the analysis, the service that is preparing the accessibility analysis (e.g., the website analyzer 120) may request that URLs identified in the analysis be normalized by the URL normalizing system 110. In such an example, the URL normalization request is being performed on data prepared for a particular user account, and the URL normalization request may therefore specify the particular user account.

The URL normalizing system 110 may have access to a collection of URL normalizing rules 150. The collection of URL normalizing rules may include some rules that are designated as default rules that apply to all URL normalizations, and some rules that are designated as optional rules that apply to a URL normalization only if activated for a certain user account to which a normalization request relates. The account-specific rule activations 160 stores information that indicates which optional rules from the collection of normalizing rules 150 are activated for certain user accounts.

The URL normalizing system 110 includes a rule selector 112 that identifies the user account to which a URL normalization request relates, and accesses the collection of URL normalizing rules 150 and the account-specific rule activations 160 to select a set of default and optional URL normalization rules that apply to the URL normalization request. A normalizer 114 applies the selected set of URL normalization rules to an input URL to generate a normalized URL.

In some examples this normalized URL is sent back to the requesting service (e.g., the website analyzer 120). In some examples, a hasher 116 performs a hash on the normalized URL to generate a numerical value that may be used to represent the normalized URL, and this hashed numerical value is sent back to the requesting service. In some examples, both the normalized URL and the hashed numerical value are sent back to the requesting service.

A website analyzer (e.g., the first type of website analyzer 120) may store webpage analysis information in association with an indication of a normalized URL. An indication of a normalized URL may be the normalized URL itself, a hashed numerical identifier generated by hashing the normalized URL, or an artificial value stored in association with the normalized URL in a data storage system (e.g., a "7" to identify the 7th URL that is normalized). As such, multiple analyses that represent the same webpage but were generated from different URLs may be stored in association with the same identifier.

In FIG. 1, the storage 140 as illustrated as including four different collections of analyses information for four different normalized URLs. The designation of a normalized URL in the figure (e.g., "norm_URL#1" represents an indication of a normalized URL, such the normalized URL or a hash value generated therefrom). The designation of analysis information in the figure (e.g., "analysis_info1") can represent analysis information generated as a result of multiple different analyses of a web page.

A website analyzer can also request previously-stored analysis information, as illustrated in FIG. 1 with the second type of website analyzer 130 requesting from storage 170 an analysis stored in association with an indication of a normalized URL. As illustrated in FIG. 1, both storages 140 and 170 can store different analyses for the same identifier. Responsive to a request for analysis information, the storage 170 can return such analyses information from both storages 140 and 170. Both of storages 140 and 170 may store analyses information and respond to requests for analysis information.

Figure 2:
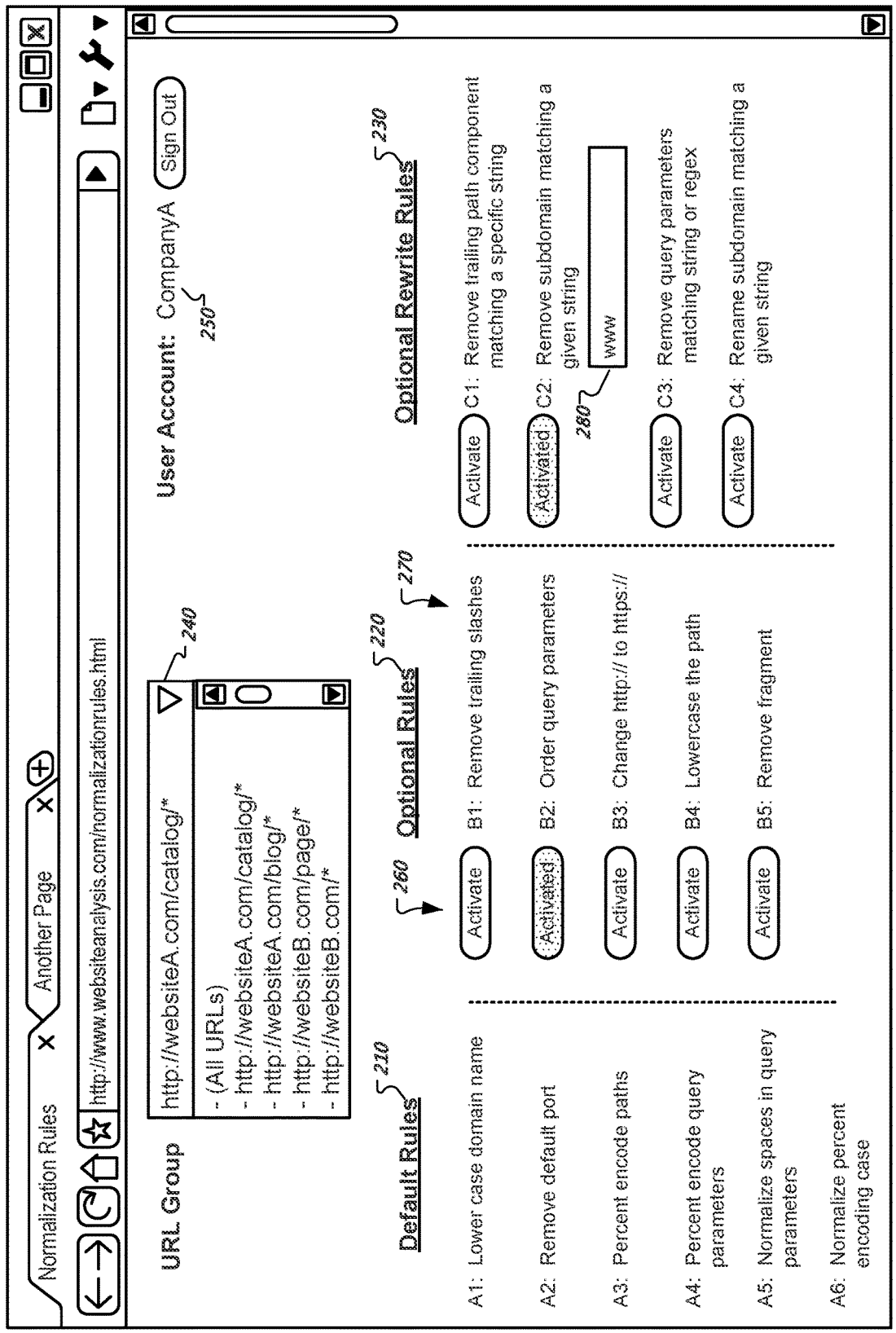
FIG. 2 shows a user interface that enables user input to activate URL normalization rules.

FIG. 2 shows a user interface that enables user input to activate URL normalization rules. The user interface includes a list of default rules 210, a list of optional rules 220, and a list of optional rewrite rules 230. These lists represent different categories of rules that can apply to a URL normalization process, in which an input URL is transformed by an application of multiple rules into a normalized URL. The user interface shown in FIG. 2 may be that shown at a computing device that has logged into the URL normalizing system 110 (FIG. 1) with a certain user account. In this illustration, the user interface shows that the user account "CompanyA" has logged into the URL normalizing system 110, and the FIG. 2 user interface shows URL normalization settings for that user account (e.g., user interface content that shows which rules are activated).

The URL group selector 240 is an interface element that enables user input to select a particular group of URLs to which URL normalization settings may apply. In the FIG. 2 illustration, the URL group selector 240 lists a catch-all URL group "(All URLs)" and four specific groups of URLs: http://websiteA.com/catalog/*, http://websiteA.com/blog/*, http://websiteB.com/page/*, and http://websiteB.com/*. As indicated by a top portion of the pull-down menu which comprises the URL group selector 240, user input has currently selected the URL group http://websiteA.com/catalog/*. This selection means that the currently-displayed URL activations are specific to the selected URL group. Changing the selected URL group may cause the user interface to show the same three lists of URL activation rules 210, 220, and 230, but with different specific rules activated.

The "(All URLs)" URL group represents all URLs. As such, rules activated for the "all URLs" setting can apply to all pages. In some implementations, this includes pages that fall into other URL groups. In some implementations, this includes only those pages do not fall into the other URL groups.

The "http://websiteA.com/catalog/*" URL group represents all webpages with a base path of "http://websiteA.com/catalog/" (the "*" symbol represents a wildcard character).

The "http://websiteA.com/blog/*" URL group represents all webpages with a base path of "http://websiteA.com/blog/". Since the URL group selector 240 does not show a URL group for "http://websiteA.com/*", all webpages for the websiteA.com website that do not belong to the "catalog" path or the "blog" path may be governed by the "(All URLs)" rule.

The "http://websiteB.com/page/*" URL group represents all webpages with a base path of "http://website.com/page/".

The "http://websiteB.com/*" URL group represents all webpages from the companyB.com webpage. In some implementations, this URL group excludes pages that belong to the "page" path, since there is a separate URL group for that specific portion of the webpage.

Although not shown in FIG. 2, the user interface may enable an individual to add and remove URL groups, for example, by entering text into a text field to specify at least part of a URL that defines the URL group.

The list of default rules 210 lists six URL normalization rules, designated A1-A6. These six rules may be default rules that the URL normalizing system 110 applies to all input URLs, despite the user account for which a URL normalization is being performed and despite whether the input URL belongs to any particular URL group.

Application of Rule A1 includes changing any characters in a domain name portion of an input URL from upper case to lower case.

Application of Rule A2 includes removing a default port from an input URL, for example removing the characters "80" for http and "443" for https.

Application of Rule A3 includes percent encoding the path portion of an input URL, for example, encoding all non-ASCII characters in the path portion with percent encoding (e.g., using UTF-8).

Application of Rule A4 includes percent encoding query parameters in an input URL, for example, encoding all non-ASCII characters in any query parameters in an input URL with percent encoding (e.g., using UTF-8).

Application of Rule A5 includes normalizing spaces in any query parameters in an input URL.

Application of Rule A6 includes normalizing the case of percent encoding in an input URL, for example, changing "%2F" to "%2f".

The list of optional rules 220 lists five URL normalization rules. The listing 220 includes, for each rule, a text portion 270 and an activation interface element 260. The text portion 270 includes text to describe the corresponding rule, and the activation interface element 260 is user selectable to toggle a rule between a deactivated status and an activated status. Any activation may apply to only (1) a currently-logged in user account 250, and (2) a currently-selected URL group that is currently selected using the URL group selector 240.

Application of Rule B1 includes removing any trailing slashes in a URL (e.g., changing "http://example.com/folder/" to "http://example.com/folder").

Application of Rule B2 includes ordering query parameters. For example, should an input URL include multiple query parameters, the computing system can order them in alphabetical order by parameter name. Should two parameters have the same name, the system may order the parameters by value.

Application of Rule B3 includes changing "http://" in an input URL to "https://".

Application of Rule B4 includes lowercasing any uppercase characters in the path portion of an input URL.

Application of Rule B5 includes removing the fragment of any input URL.

For example, the computing system may change the URL "http://example.com/folder#section" to http://example.com/folder".

The list of optional rewrite rules 230 lists four URL normalization rules. The listing 230 includes, for each rule, a text portion and a corresponding activation interface element. The optional rewrite rules 230 differ from the optional rules 220, because the optional rewrite rules 230 require user entry of text that defines part of an application of the corresponding rule. Optional rules 220 operate in a defined manner, and user interaction with the listing of optional rules 220 may only be able activate or deactivate application of the optional rules 220 (not changing how the rules are executed). In contrast, responsive to user input activating an optional rewrite rule, for example as illustrated in FIG. 2 with Rule C2, the user interface presents a text input field 280 that enables user input to specify text that is used as part of the operation of the corresponding rule.

Application of Rule C1 includes removing a trailing path component that matches a user-specified string. For example, should user input specify the text "index.html" in a text field that appears upon user-activation of Rule C1, application of the rule may change the URL "http://example.com/index.html" to "http://example.com/".

Application of Rule C2 includes removing a subdomain matching a user-specified string. For example, should user input specify the text "www" in a text field that appears upon user-activation of Rule C2, application of the rule may change the URL "http://www.example.com" to "http://example.com".

Application of Rule C3 includes removing query parameters from an input URL that match a user-specified string or regex. For example, should user input specify the string "orderid" in a text field that appears upon user-activation of Rule C3, application of the rule may change the URL "http://example.com/?orderid=72" to "http://example.com/".

Application of Rule C4 includes renaming a subdomain that matches a user-specified string within an input URL. For example, should user input specify the strings "serverA" and "serverB" in text fields that appear upon user-activation of Rule C4, application of the rule may change the URL "http://serverA.example.com/" to "http://serverB.example.com".

Figure 3:
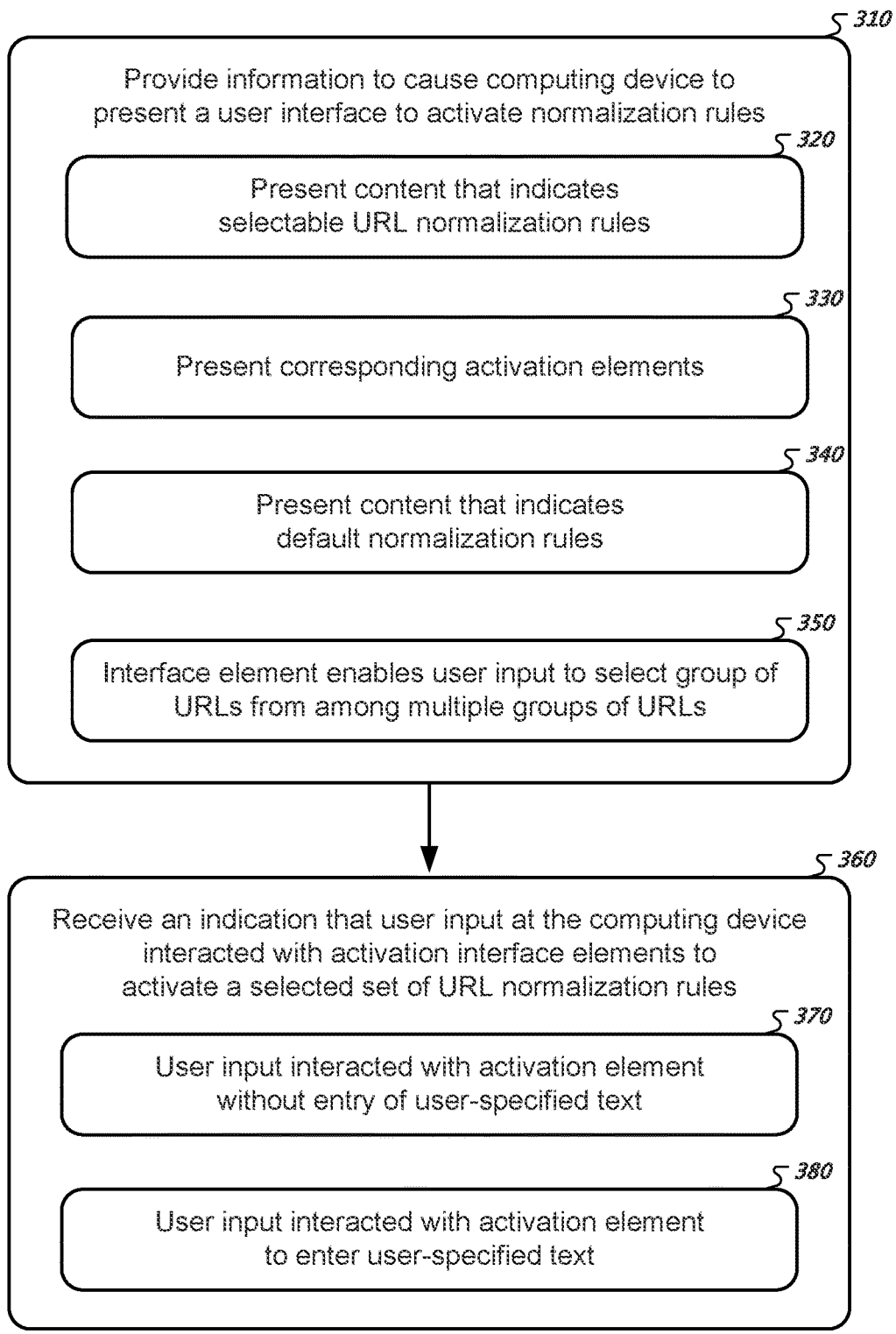
FIG. 3 shows a flowchart of operations in which user input selects normalization rules.

FIG. 3 shows a flowchart of operations in which user input selects normalization rules. The operations described with respect to the FIG. 3 flowchart may be performed by the URL normalizing system 110 to generate a presentation of the FIG. 2 user interface on a user computing device.

At box 310, the computing system provides information to a computing device to cause the computing device to present a user interface to activate normalization rules. For example, the URL normalizing system 110 may provide files to a user computing device to cause a web browser of the user computing device to present the user interface shown in FIG. 2. The user computing device may be operated by a company that operates the URL normalizing system 110 or a customer of that company. The information sent to the computing device can include a web page HTML file.

At box 320, the user interface presents content that indicates selectable URL normalization rules. For example, the FIG. 2 user interface includes text that describes each of the rules B1-5 and C1-4, all of which are user-selectable.

At box 330, the user interface presents corresponding activation elements. For example, each of the rules B1-5 and C1-4 is accompanied by an interface element that is user-selectable to cause activation of the corresponding rule (e.g., changing the text "Activate" to "Activated" and changing the interface element from having no shading to being shaded).

At box 340, the user interface presents content that indicates default normalization rules. For example, the FIG. 2 user interface includes text that describes each of the rules A1-6.

At box 350, the user interface includes an interface element that enables user input to select a group of URLs from among multiple groups of URLs. For example, the URL group selector 240 enables user input to select any of five illustrated groups of URLs, at least some of which may have been specified by user input provided by a device logged into the "CompanyA" user account.

At box 360, the computing system receives an indication that user input at the computing device interacted with activation interface elements to activate a selected set of URL normalization rules. For example, user input at a client computing device may have selected some of the rules B1-5 and C1-4 through user selection of corresponding ones of the activation interface elements 260.

At box 370, user input interacted with an activation element without entry of user-specified text. For example, user input selected an activation interface element for one of the rules B1-6. Such an activation simply toggles the corresponding rule from "off" to "on", and does not involve user entry of text to define how the rule executes.

At box 380, user input interacted with an activation interface element to enter user-specified text. For example, user input may enter text into the text field 280 (a portion of activation interface element), to cause the rule C2 to only apply to input URLs that include the text that user input specified into the text field 380.

Figure 4A:
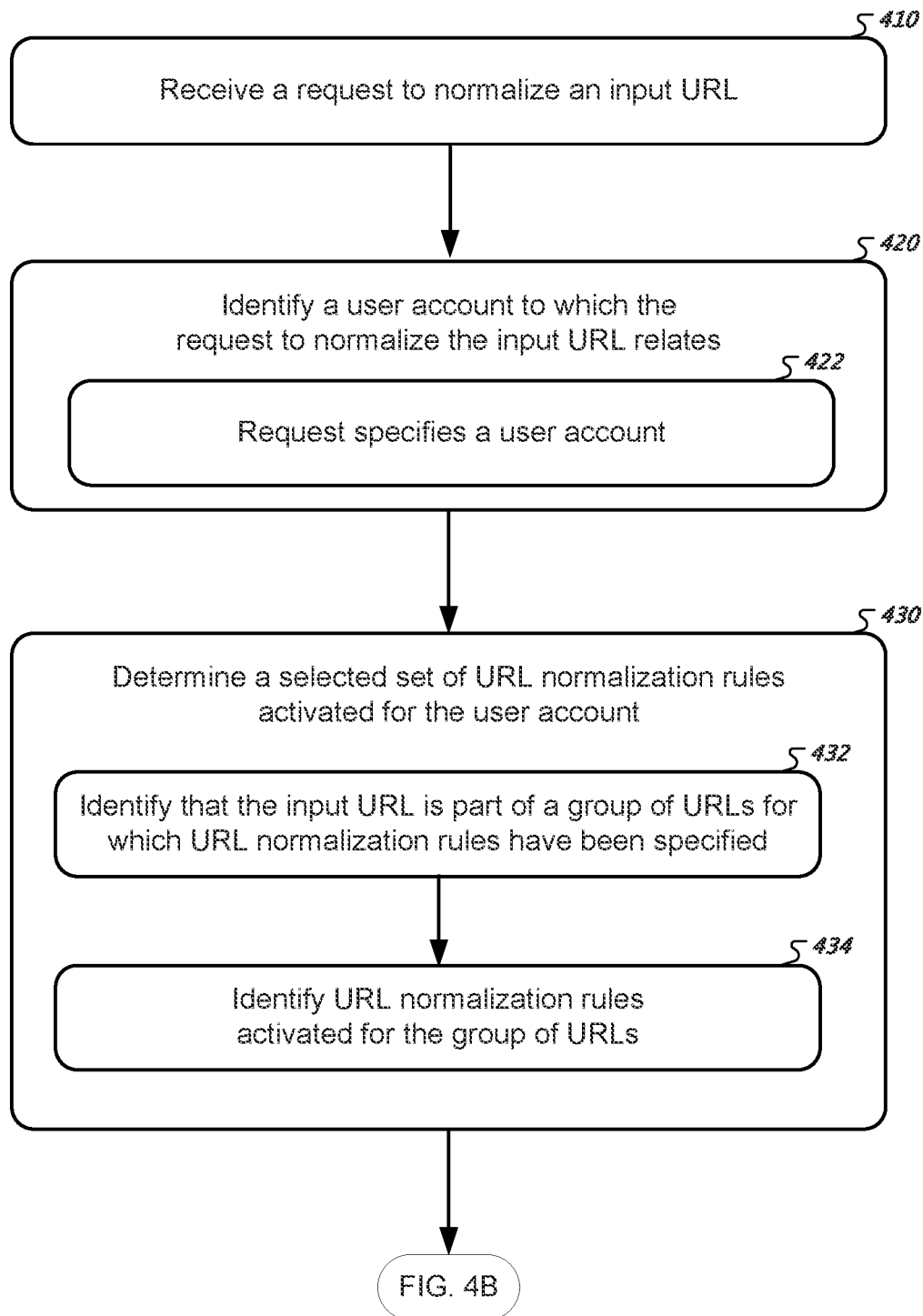
FIGS. 4A-B show a flowchart of operations in which a URL is normalized according to a selected set of rules.
Figure 4B:
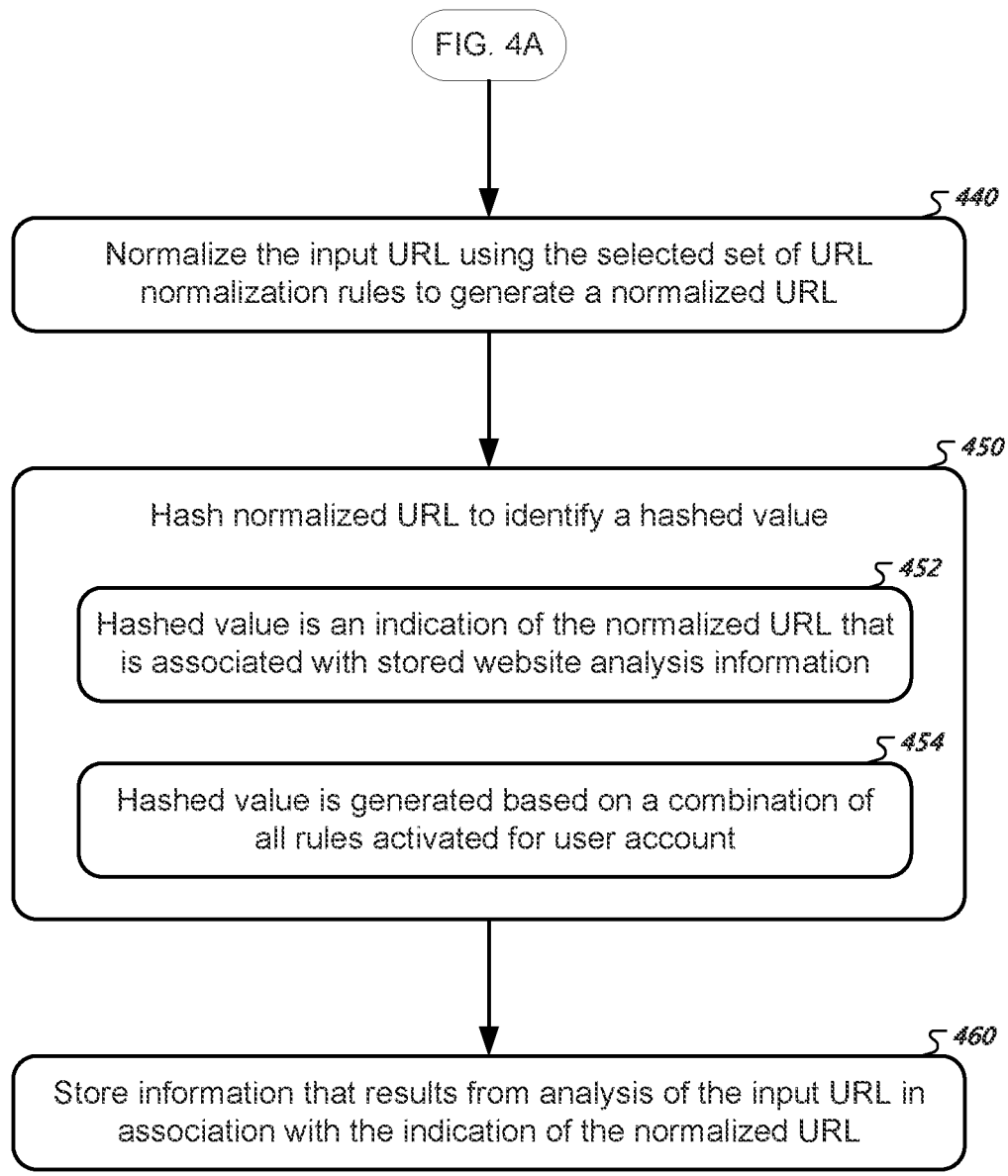

FIGS. 4A-B show a flowchart of operations in which a URL is normalized according to a selected set of rules. The operations described with respect to the FIGS. 4A-B flowchart may be performed by the URL normalizing system 110 to normalize a URL.

At box 410, a computing system receives a request to normalize an input URL. FIG. 1 illustrates two examples of such a request with the arrows extending from the website analyzers 120 and 130 to the URL normalizing system 110. The request may specify the input URL, which may be a URL with text that has not been normalized.

At box 420, the computing system identifies a user account to which the request to normalize the URL relates. The user account may be a user account for which the input URL is stored. For example, the user account may be with a website analysis system, and may have been created by an owner of a particular website. The owner of the particular website may request that the website analysis system analyze the particular website. The analysis may involve storage of analysis information in conjunction with various URLs that represent pages from the particular website (e.g., with analysis information indicating spelling errors and URLs of the pages on which those spelling errors occur).

At box 422, the computing system may identify the user account corresponding to the request to normalize the input URL, due to the request specifying the user account (e.g., the request including the user-account-identifying text "CompanyA").

At box 430, the computing system may determine a selected set of URL normalization rules that are activated for the user account. For example, the rule selector 112 may use an indication of the user account to access a portion of the account-specific rule activations storage 160 that indicates which rules have been activated for the user account (e.g., based on settings specified through user interaction with the FIG. 2 user interface). The rule selector 112 may then retrieve the actual rules that have been activated from the collection of URL normalizing rules storage 150. The activated rules may include all rules from the default rules listing 210, and one or more rules from each of the optional rules listing 220 and the optional rewrite rules listing 230.

At box 432, the computing system identifies that the input URL is part of a group of URLs for which URL normalization rules have been specified. For example, the rule selector 112 may determine that the input URL to be normalized is "http://websiteA.com/catalog/product7", and therefore that the input URL falls within the URL group "http://websiteA.com/catalog/*".

At box 434, the computing system identifies URL normalization rules that are activated for the group of URLs. For example, the FIG. 2 user interface shows that, for the URL group "http://websiteA.com/catalog/*", the activated rules include the default rules A1-6, the optional rule B2, and the optional rewrite rule C2. In some examples, the computing system only identifies rules that are activated for a user account, and URL groups with different sets of activation rules are not configured for a particular user account.

At box 440, the computing system normalizes the input URL using the selected set of URL normalization rules, to generate a normalized URL. For example, the normalizer 114 may apply each of rules A1-6, B2, and C2, one after another, to convert the input URL to a normalized URL.

At box 450, the computing system may hash the normalized URL to identify a hashed value. For example, the hasher 116 may input the normalized URL into a hash function to generate a 128-bit numerical hash value.

At box 452, the hashed value may be used as an indication of the normalized URL that is associated with stored website analysis information. In other embodiments, the computing system assigns an artificial identifier to the normalized URL (e.g., a first-ever normalized URL is assigned an identifier of "00001", a second-ever normalized URL is assigned an identifier of "00002," and so forth). Using a hashed value instead of an artificial identifier can eliminate a need to maintain a database of normalized URLs and their corresponding identifiers, and can eliminate a need to perform database lookups to transform normalized URLs into numerical identifiers.

At box 454, in some implementations, the hashed value is generated based on a combination of all rules activated for the user account. For example, the URL normalization rules that are used to normalize a URL before being hashed may include a union of all rules that have been activated for a user account (e.g., all activations across all URL groups for the user account). The normalized URL that is used as an input to a hash function may therefore have been normalized with more rules than the normalized URL that is presented to a user for a given input URL.

At box 460, the computing system stores information that results from an analysis of the input URL in association with the indication of the normalized URL. The indication of the normalized URL may be the normalized URL itself, the above-described hash value generated from the normalized URL, and/or the above-described artificial identifier.

Figure 5:
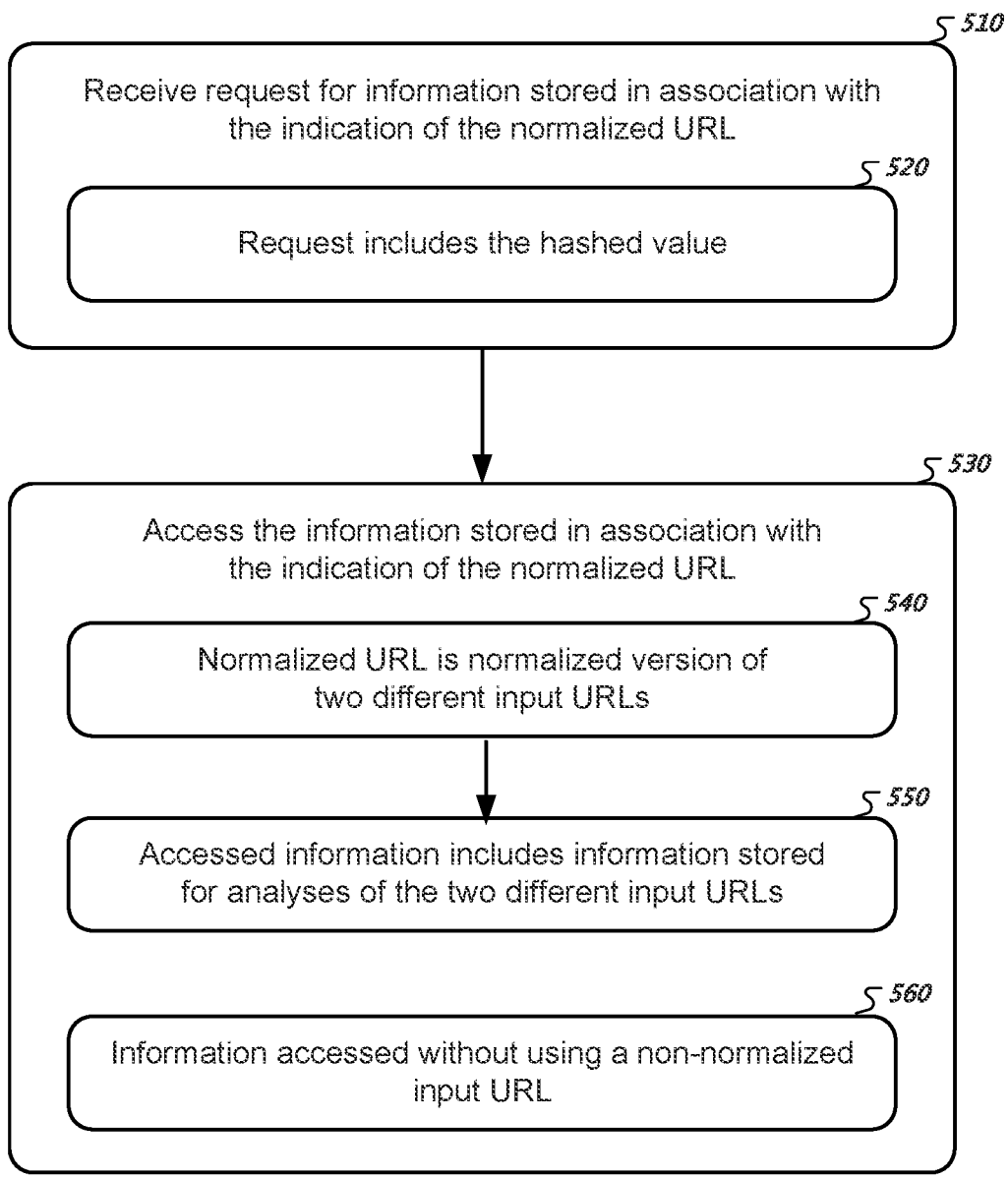
FIG. 5 shows a flowchart of operations to request information using an indication of a normalized URL.

FIG. 5 shows a flowchart of operations to request information using an indication of a normalized URL. The operations described with respect to the FIG. 5 flowchart may be performed by either of the website analyzers 120 and 130. In FIG. 1, the request is illustrated as being performed by the second type of website analyzer 130.

At box 510, the computing system receives a request for information stored in association with the indication of the normalized URL. For example, the website analyzer 130 may send a request to the storage 170 for information. The request may specify an indication of the normalized URL. For example, the request may include a hash value that was generated from a normalized URL (box 520).

The request by the website analyzer 130 may be in response to a request that it had received from a user device, where the request from the user device may have included a URL. The website analyzer 130 may have sent the URL to the URL normalizing system 110 and received back a hash value of a normalized version of the URL. It is this hash value that the website analyzer 130 may then send to storage 170 in order to fetch information stored for the normalized version of the URL.

At box 530, the computing system accesses the information stored in association with the indication of the normalized URL. For example, the website analyzer 130 uses the hash value (or the normalized URL, or an artificial identifier) in a database lookup to access analyses information stored in association with the hash value. The analyses information may include information that indicates quality issues with a webpage represented by the normalized URL (e.g., issues with the webpage such as spelling errors, broken links, accessibility issues). Accessing such information may transfer such information from the storage 170 to memory of the website analyzer 130.

At box 540, in some examples the normalized URL is a normalized version of two different input URLs. For example, two different URLs may include different subdomains before the URLs are sent to the URL normalizing system 110, but URL normalization rules applied to the two URLs may convert both URLs to the same underlying normalized URL.

At box 560, the accessed information includes information stored from analyses performed in relation to the two different URLs. For example, the request by the website analyzer 130 for information stored in association with "norm_URL#1" may return "analysis_info1" from storage 140 and "analysis_infoA" from storage 170. These different analyses may have been conducted by or received at different website analyzers (e.g., the first type of website analyzer 120, which may perform or request an accessibility analysis, and the second type of website analyzer 130, which may perform or request a quality analysis).

As such, the overall computing system (e.g., the collection of computing components shown in FIG. 1) may perform and receive many different types of analyses that use inconsistent variations of URLs for different webpages, and the system stores such analysis information that arrives from different sources in association with an indication of a single normalized URL.

Figure 6A:
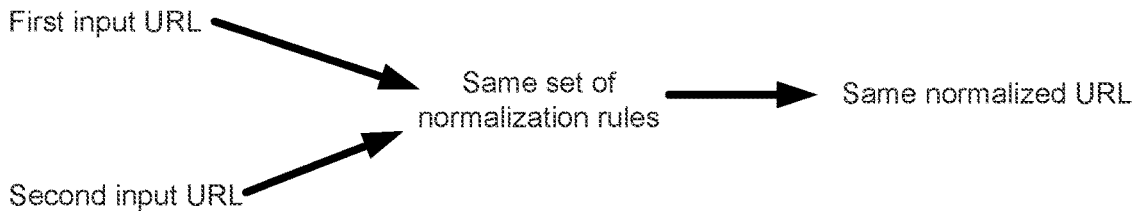
FIGS. 6A-C show different scenarios in which URLs can be normalized.

This example, of multiple different URLs being variations of each other (representing the same underlying webpage) that are normalized to a same normalized URL, is illustrated in FIG. 6A.

Figure 6B:
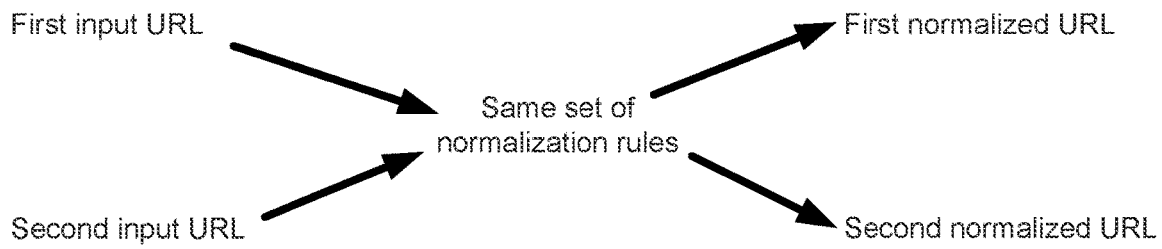

This is in distinction to a potentially more common occurrence, in which two different URLs that are not variations of each other (e.g., they relate to two completely different webpages from different portions of a website) result in two completely different normalized URLs, despite using the same set of normalization rules, as illustrated in FIG. 6B.

Figure 6C:
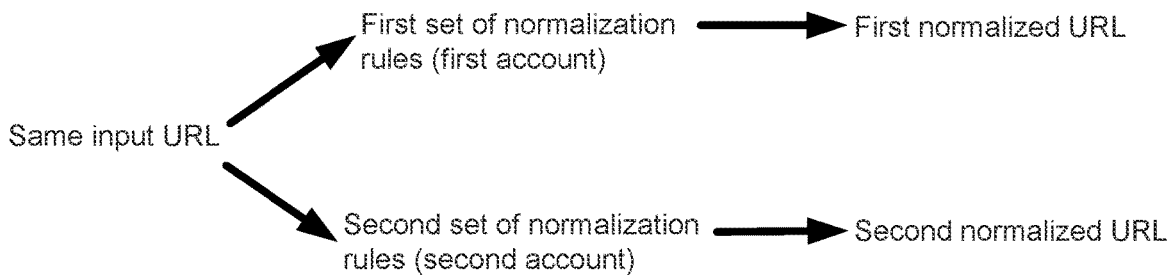

Another possible occurrence is that the same input URL can be normalized to different normalized URLs, based on the input URL going through different sets of normalization rules, as illustrated in FIG. 6C. Such a situation may occur where two different user accounts request a quality analysis of a same webpage. In such a situation, the system may receive similar/same analysis information regarding the webpage from a third-party system, but the user accounts with the computing system may have different sets of normalization rules activated. As such, the computing system may store the received webpage analysis information in association with different normalized URLs for the different user accounts.

Figure 7:
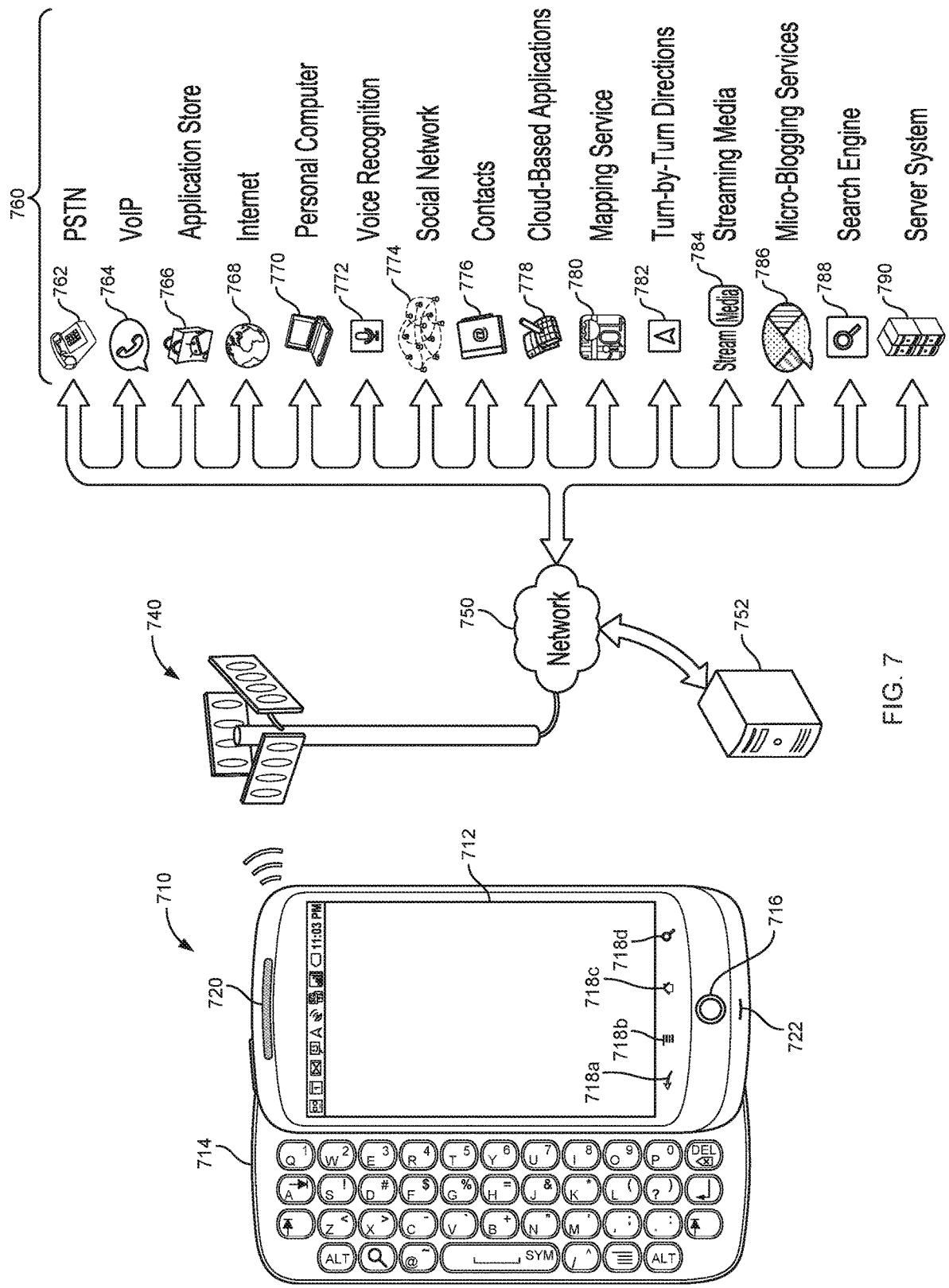
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or an application telephone) that includes a touchscreen display device 712 for presenting content to a user of the mobile computing device 710 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 714, physical buttons, trackballs, accelerometers, gyroscopes, and magnetometers).

Example visual output mechanism in the form of display device 712 may take the form of a display with resistive or capacitive touch capabilities. The display device may be for displaying video, graphics, images, and text, and for coordinating user touch input locations with the location of displayed information so that the device 710 can associate user contact at a location of a displayed item with the item. The mobile computing device 710 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a track pad enables the user to supply directional and rate of movement information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 714. User-selection of the button may invoke the pre-defined action.

In some examples, the operating system provides a "desktop" graphical user interface that is displayed after turning on the mobile computing device 710, after activating the mobile computing device 710 from a sleep state, after "unlocking" the mobile computing device 710, or after receiving user-selection of the "home" button 718c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 710 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 710 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 710. The mobile computing device 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., ETHERNET, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computing systems that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing systems associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call using a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving"

from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 8:
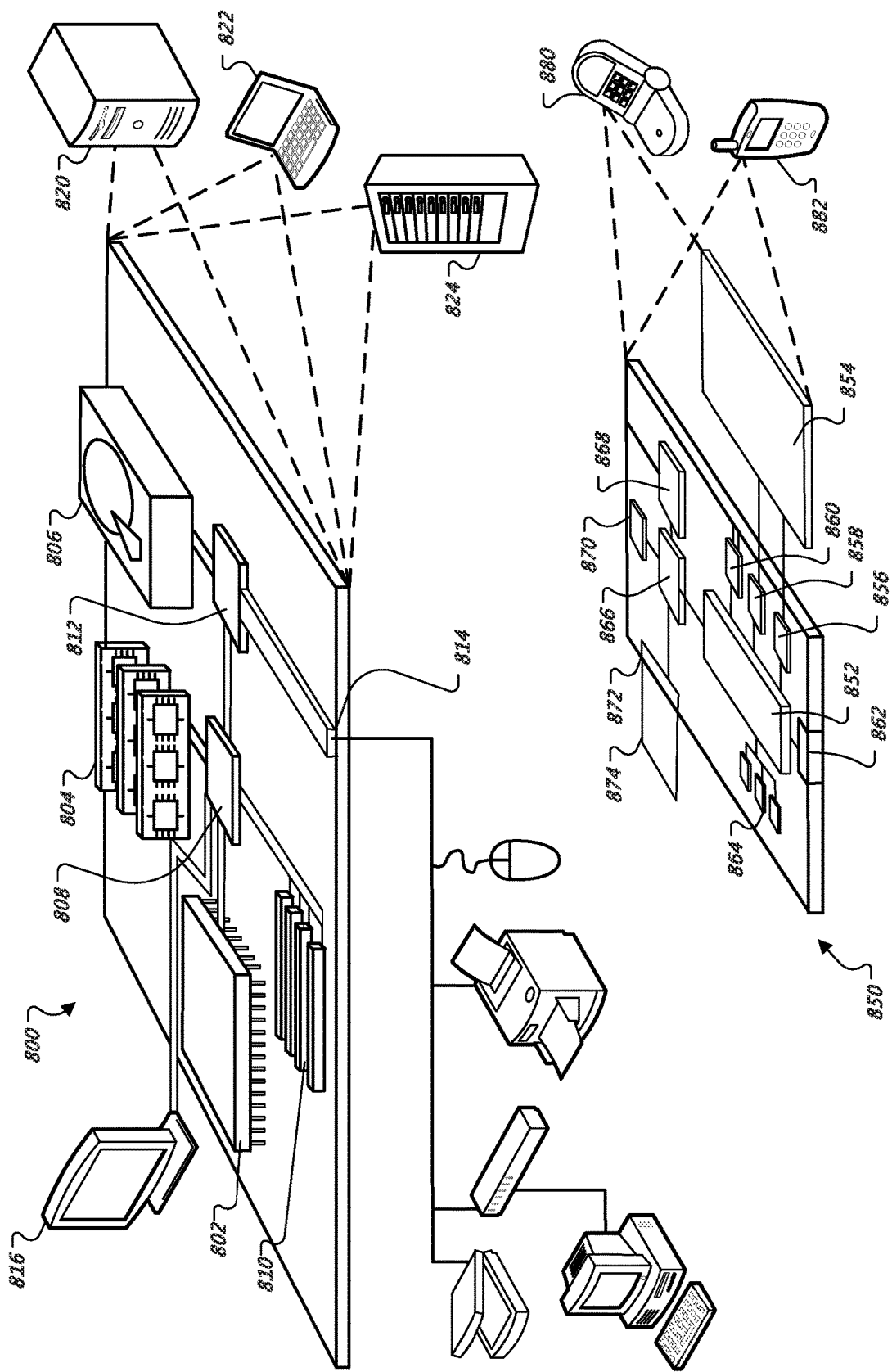
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 800 includes a processor 802, memory 804, a storage device 806, a high-speed controller 808 connecting to memory 804 and high-speed expansion ports 810, and a low speed controller 812 connecting to low speed expansion port 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed controller 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is an example only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing system, a request to normalize an input Uniform Resource Locator (URL);
identifying, by the computing system, a user account to which the request to normalize the input URL relates;
determining, by the computing system, a selected set of URL normalization rules that are identified as being activated for the user account from among a larger collection of URL normalization rules;
normalizing, by the computing system, the input URL using the selected set of URL normalization rules to generate a normalized URL;
hashing, by the computing system, the normalized URL to identify a hashed value that represents the normalized URL;
storing, by the computing system, information that results from an analysis of the input URL in association with the hashed value;
receiving, by the computing system, a request for information that results from a URL analysis, the request for information that results from the URL analysis including the hashed value; and
accessing, by the computing system using the hashed value responsive to receiving the hashed value in the request for information that results from the URL analysis:
(i) the information that results from the analysis of the input URL, and
(ii) second information that results from an analysis of a second input URL that is different from the input URL, without the accessing using the input URL and without the accessing using the second input URL, wherein the normalized URL represents a normalized version of the second input URL when the second input URL is normalized according to the selected set of normalization rules.

2. The computer-implemented method of claim 1, comprising:
receiving, by the computing system, a request to normalize the second input URL;
identifying, by the computing system, that the request to normalize the second input URL relates to same said user account to which the request to normalize the input URL relates;
normalizing, by the computing system, the second input URL using the selected set of URL normalization rules to generate same said normalized URL, based on the selected set of URL normalization rules being activated for the user account; and
storing, by the computing system, the second information that results from an analysis of the second input URL in association with the hashed value.

3. The computer-implemented method of claim 1, comprising:
providing, by the computing system for receipt by a computing device at which the user account has logged in, information to cause the computing device to present a user interface to activate normalization rules, the user interface presenting content that indicates multiple URL normalization rules from the collection of URL normalization rules along with corresponding activation interface elements that enable user input to selectively activate selected URL normalization rules of the multiple URL normalization rules that are indicated by the user interface; and
receiving, by the computing system, an indication that user input at the computing device interacted with activation interface elements presented by the user interface to activate the selected set of URL normalization rules for the user account.

4. The computer-implemented method of claim 3, wherein:
the multiple URL normalization rules represent the collection of URL normalization rules, such that the user interface presents content that indicates all URL normalization rules of the collection of URL normalization rules.

5. The computer-implemented method of claim 3, wherein the indication that user input at the computing device that interacted with the activation interface elements to activate the selected set of URL normalization rules includes:
an indication that a first user input that interacted with a first activation interface element to activate a first URL normalization rule from the collection of URL normalization rules; and
an indication that a second user input that interacted with a second activation interface element to activate a second URL normalization rule from the collection of URL normalization rules.

6. The computer-implemented method of claim 5, wherein:
the first user input that activated the first URL normalization rule included a first user interaction with the first activation element without entry of user-specified text, the first URL normalization rule not being customizable by user input through interaction with the user interface.

7. The computer-implemented method of claim 6, wherein:
the second user input that activated the second URL normalization rule included a second user interaction with the second activation element to enter user-specified text, the user-specified text indicating text content in URLs on which the second URL normalization rule is to operate.

8. The computer-implemented method of claim 7, wherein:
the second URL normalization rule is configured to modify the user-specified text in a manner that is defined by the second URL normalization rule and not defined by the user-specified text, the manner that the second URL normalization rule is configured to modify the user-specified text not being customizable by user input through interaction with the user interface.

9. The computer-implemented method of claim 1, comprising:
receiving, by the computing system, a request to normalize a third input URL;
identifying, by the computing system, a second user account to which the request to normalize the third input URL relates;
determining, by the computing system, a second selected set of URL normalization rules that are identified as being activated for the second user account from among the larger collection of URL normalization rules, the second selected set of URL rules that are activated for the second user account being different from the selected set of URL normalization rules that are activated for the user account;

normalizing, by the computing system, the third input URL using the second selected set of URL normalization rules to generate a second normalized URL, the second normalized URL being different from the normalized URL; and storing, by the computing system, information that results from an analysis of the third input URL in association with an indication of the second normalized URL.

10. The computer-implemented method of claim 1, wherein:

identifying the user account to which the request to normalize the input URL relates includes identifying that the request to normalize the input URL specifies the user account.

11. The computer-implemented method of claim 1, comprising:

providing, by the computing system for receipt by a computing device at which the user account has logged in, information to cause the computing device to present a user interface to activate normalization rules, the user interface presenting activation interface elements that enable user input to (i) select a selected group of URLs from among multiple different groups of URLs, and (ii) select a portion of the collection of URL normalization rules to apply to the selected group of URLs;

receiving, by the computing system, user input that interacts with the activation interface elements of the user interface to specify that the selected set of URL normalization rules are to apply to URLs in a first group of URLs from among the multiple different groups of URLs; and identifying, by the computing system, that the input URL is part of the first group of URLs, wherein determining the selected set of URL normalization rules that are identified as being activated for the user account includes identifying that the selected set of URL normalization rules were specified by user input as applying to the first group of URLs and that the input URL is part of the first group of URLs.

12. The computer-implemented method of claim 11, comprising:

receiving, by the computing system, user input that interacts with one or more of the activation interface elements presented as part of the user interface to specify that a second selected set of URL normalization rules are to apply to URLs in a second group of URLs from among the multiple different groups of URLs, wherein the second group of URLs is different from the first group of URLs, wherein the second selected set of URL normalization rules are different from the selected set of URL normalization rules.

13. The computer-implemented method of claim 12, comprising:

receiving, by a computing system, a request to normalize a third input URL;

identifying, by the computing system, that the third input URL is part of the second group of URLs;

normalizing, by the computing system, the third input URL using the second selected set of URL normalization rules to generate a second normalized URL, wherein the second selected set of normalization rules includes a normalization rule that is not within the selected set of normalization rules;

hashing, by the computing system, the second normalized URL using a combination of all URL rules from the selected set of URL normalization rules and all URL rules from the second selected set of URL normalization rules, including the normalization rule that is not within the second selected set of normalization rules and excluding multiple normalization rules from the collection of URL normalization rules that are not activated for the user account, to identify a second hashed value that identifies the second normalized URL; and storing, by the computing system, information that results from an analysis of the third input URL in association with the second hashed value.

14. A computing system, comprising:

one or more processors; and one or more computer-readable devices including instructions that, when executed by the one or more processors, cause the computing system to perform operations that include:

receiving, by the computing system, a request to normalize an input Uniform Resource Locator (URL);

identifying, by the computing system, a user account to which the request to normalize the input URL relates;

determining, by the computing system, a selected set of URL normalization rules that are identified as being activated for the user account from among a larger collection of URL normalization rules;

normalizing, by the computing system, the input URL using the selected set of URL normalization rules to generate a normalized URL;

hashing, by the computing system, the normalized URL to identify a hashed value that represents the normalized URL;

storing, by the computing system, information that results from an analysis of the input URL in association with the hashed value;

receiving, by the computing system, a request for information that results from a URL analysis, the request for information that results from the URL analysis including the hashed value; and accessing, by the computing system using the hashed value responsive to receiving the hashed value in the request for information that results from the URL analysis:

(i) the information that results from the analysis of the input URL, and (ii) second information that results from an analysis of a second input URL that is different from the input URL, without the accessing using the input URL and without the accessing using the second input URL, wherein the normalized URL represents a normalized version of the second input URL when the second input URL is normalized according to the selected set of normalization rules.

15. The computing system of claim 14, wherein the operations include:

receiving, by the computing system, a request to normalize the second input URL;

identifying, by the computing system, that the request to normalize the second input URL relates to same said user account to which the request to normalize the input URL relates;

normalizing, by the computing system, the second input URL using the selected set of URL normalization rules to generate same said normalized URL, based on the selected set of URL normalization rules being activated for the user account; and storing, by the computing system, the second information that results from an analysis of the second input URL in association with the hashed value.

16. The computing system of claim 14, wherein the operations include:

receiving, by the computing system, a request to normalize a third input URL;

identifying, by the computing system, a second user account to which the request to normalize the third input URL relates;

determining, by the computing system, a second selected set of URL normalization rules that are identified as being activated for the second user account from among the larger collection of URL normalization rules, the second selected set of URL rules that are activated for the second user account being different from the selected set of URL normalization rules that are activated for the user account;

normalizing, by the computing system, the third input URL using the second selected set of URL normalization rules to generate a second normalized URL, the second normalized URL being different from the normalized URL; and storing, by the computing system, information that results from an analysis of the third input URL in association with an indication of the second normalized URL.

\* \* \* \* \*